United States Patent Office 3,444,744
Patented May 20, 1969

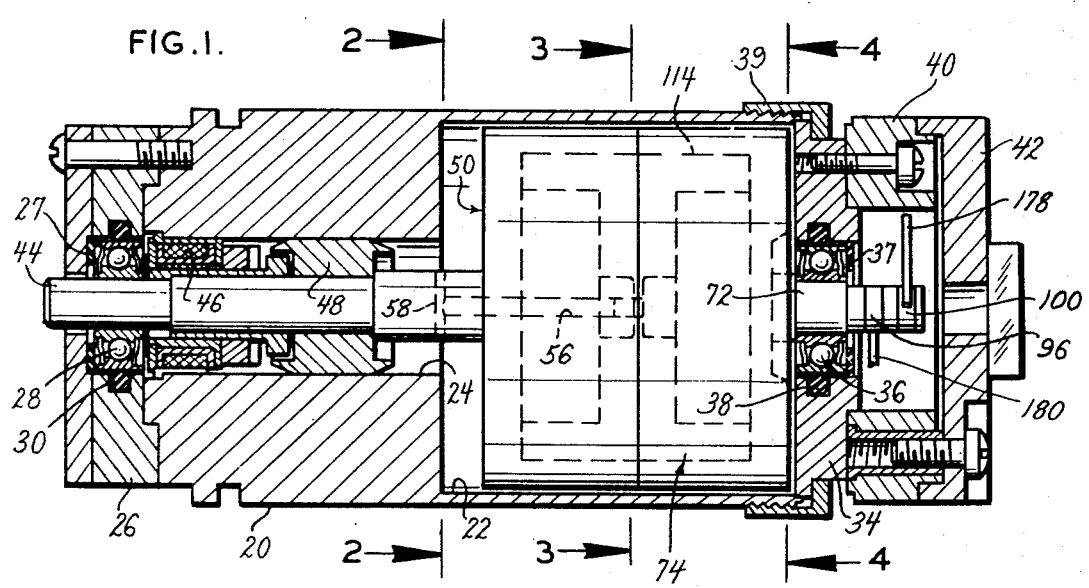
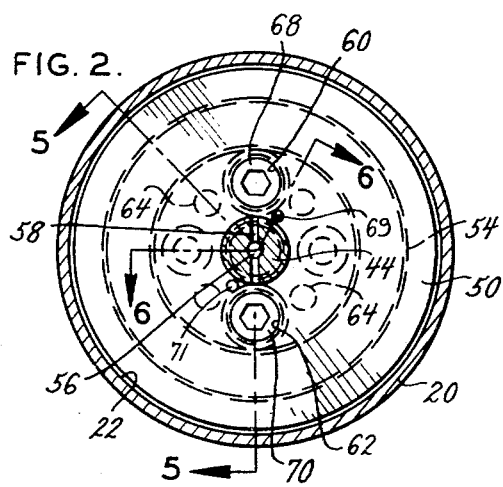
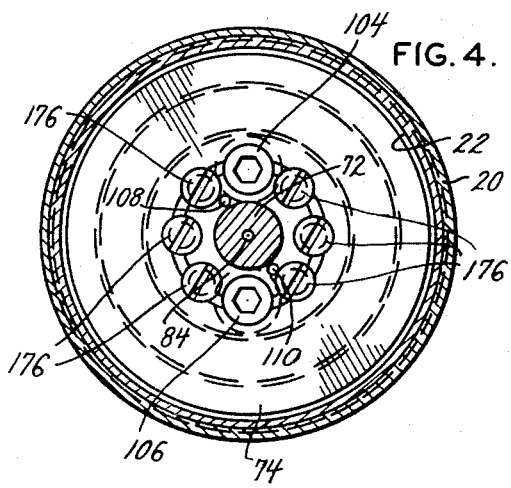
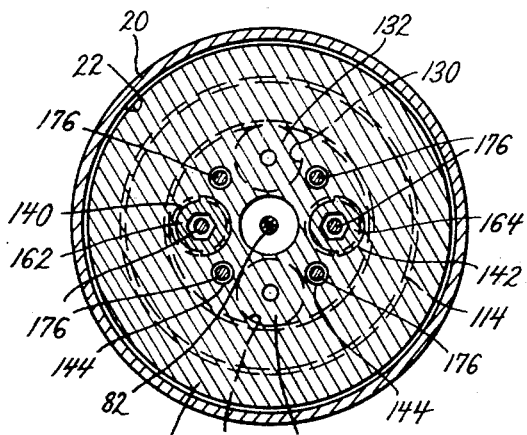
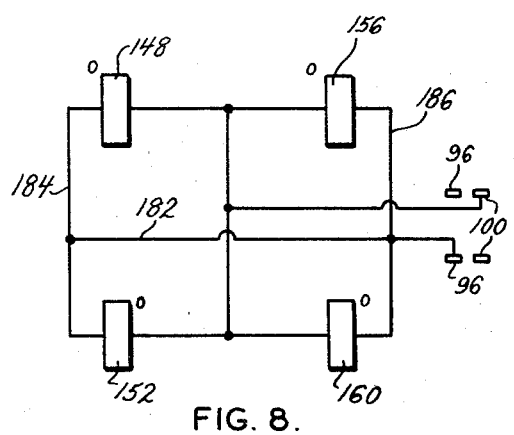

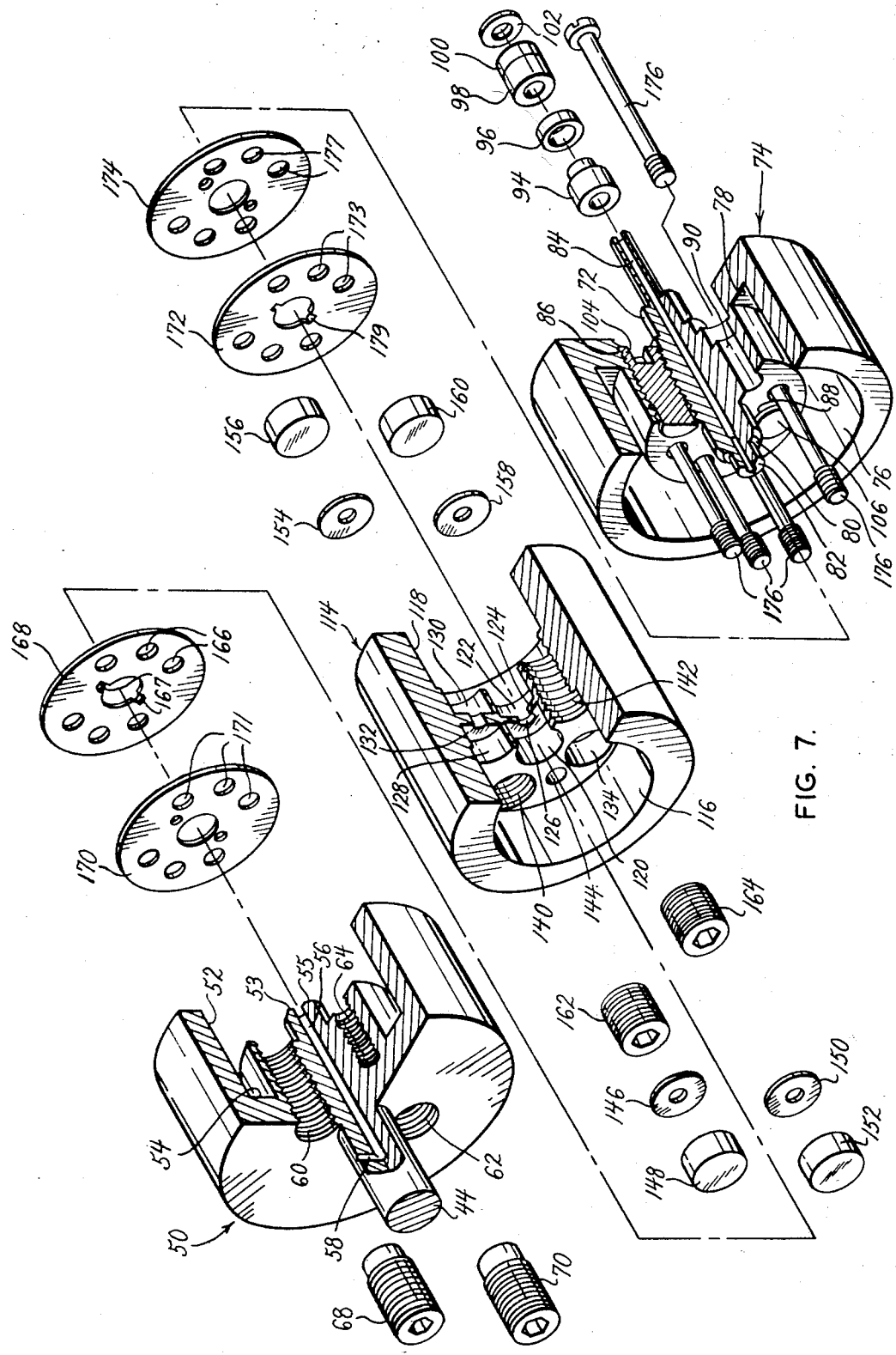

3,444,744
GYROSCOPIC APPARATUS
Allan W. Lindberg, 460 N. Taylor Ave.,
Kirkwood, Mo. 63122
Filed Aug. 4, 1965, Ser. No. 477,100
Int. Cl. G01c 19/08
U.S. Cl. 74—5                                                           8 Claims

ABSTRACT OF THE DISCLOSURE

A gyroscope includes an outer rotor with an annular recess therein that is elongated adjacent the periphery thereof and that is substantially shorter intermediate that periphery and the center thereof, includes an inner rotor that is disposed within the annular recess in the outer rotor and that has an elongated peripheral portion that is disposed within and that substantially fills the elongated portion of the annular recess in the outer rotor and also has a substantially shorter portion that is disposed within and that substantially fills the substantially shorter intermediate portion of the annular recess in the outer rotor, includes substantially incompressible sensing elements which are close to the center of the inner rotor and which are compressed between substantially incompressible and substantially inflexible confronting portions of the inner and outer rotors, and includes a connection between the inner and outer rotors which enables the inner rotor to vary the compressive forces on the sensing elements as the outer rotor is rotated about an axis which is annularly displaced from the spin axis of the gyroscope.

---

Figure 5:
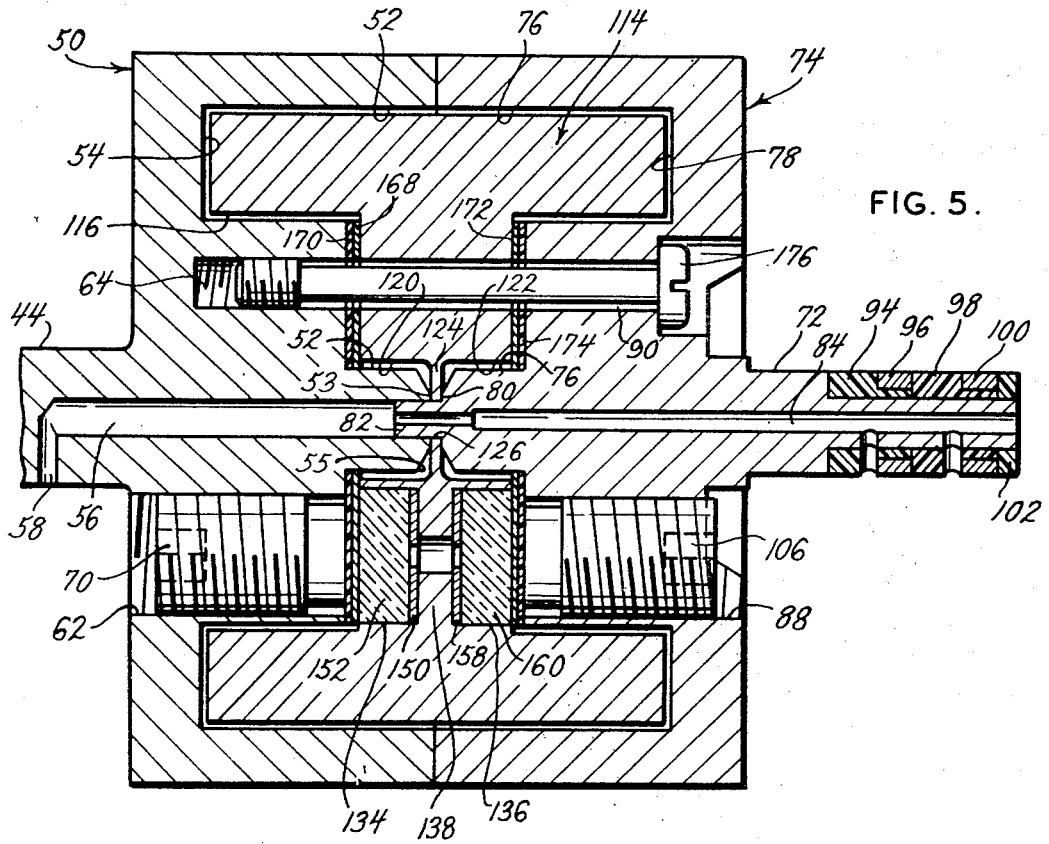

This invention relates to improvements in gyroscopic apparatus. More particularly, this invention relates to improvements in rate gyroscopes.

It is, therefore, an object of the present invention to provide an improved rate gyroscope.

Rate gyroscopes are important and useful because they facilitate the measuring of the rates of angular displacement of the axis of movement of movable devices such as aircraft, missiles, and the like. In recognition of that fact, a number of rate gyroscopes have been proposed. However, many of those rate gyroscopes are not adequate because they cannot provide sufficiently rapid responses to the angular displacements of the axes of movement of the movable devices with which they must be used. Other of those rate gyroscopes are not satisfactory because they are not rugged enough to withstand the high acceleration forces to which they could be subjected. Still other of those rate gyroscopes are not satisfactory because they are complex, or because they must be made by precise and costly methods. It would be desirable to provide a rate gyroscope which could provide a rapid response to the angular displacement of the axis of movement of the movable device with which it is used, which was rugged enough to withstand the high acceleration forces to which it could be subjected, and which was simple and could be made by inexpensive methods. The present invention provides such a rate gyroscope; and it is, therefore, an object of the present invention to provide a rate gyroscope which can provide a rapid response to the angular displacement of the axis of movement of the movable device with which it is used, which is rugged enough to withstand the high acceleration forces to which it can be subjected, and which is simple and can be made by inexpensive methods.

The rate gyroscope provided by the present invention is a dual rotor gyroscope which has a solid outer rotor and a solid inner rotor. The outer rotor encloses the inner rotor; and a mechanical connection between those rotors forces the inner rotor to rotate with the outer rotor substantially as a unit. In the preferred embodiments of the present invention, that mechanical connection includes sensing elements which are sensitive to changes in the forces thereon and which can respond to such changes to develop signals. When the outer rotor is rotated at high speed about a spin axis and is then caused to precess, the mechanical connection between the rotors forces the inner rotor to precess at the same rate. The sensing elements in that mechanical connection will experience changes in the forces thereon, ruring the precession of the gyroscope; and the rate at which that gyroscope precesses will determine the changes in the forces on those elements, and will thus determine the magnitude of the signal developed by those elements. Because the sensing elements are rotating, the changes in the forces thereon resemble vibrations and thus enable those elements to develop readily detectable signals. Because the outer and inner rotors and the sensing elements rotate substantially as a unit, the gyroscope provided by the present invention is free of many unbalance errors and many bias errors to which other rate gyroscopes are subject. Consequently, the gyroscope provided by the present invention is unusually accurate and unusually sensitive. It is, therefore, an object of the present invention to provide a rate gyroscope which has a solid outer rotor, a solid inner rotor, and a mechanical connection between those rotors which forces those rotors to rotate substantially as a unit.

A reference signal generator rotates with the outer rotor; and the signal from that reference signal generator coacts with the signal developed by the sensing elements, in the mechanical connection between the inner and outer rotors, to enable a phase sensitive detector to indicate the direction of angular displacement of the spin axis of the outer rotor. Because that mechanical connection forces those rotors to rotate substantially as a unit, the angular relationship between that reference signal generator and those sensing elements remains constant. As a result, the rate gyroscope provided by the present invention is unusually accurate. Further, the time constant of the rate gyroscope provided by the present invention can be a controlled but rapid time response. It is, therefore, an object of the present invention to provide a rate gyroscope which has a solid outer rotor, a solid inner rotor, a mechanical connection between those rotors which forces those rotors to rotate substantially as a unit, sensing elements in that mechanical connection, and a reference signal generator that rotates with said outer rotor.

The sensing elements in the mechanical connection between the inner rotor and the outer rotor of the rate gyroscope provided by the present invention are compressible; but they are compressible only to very limited extents. The extent of that compressibility is the primary factor in determining the response time of the gyroscope. In the preferred embodiments of the present invention, the sensing elements are initially compressed between the inner rotor and the outer rotor to reduce the response time of the gyroscope and to substantially eliminate all "play" between that inner rotor and that outer rotor. This is desirable, because it enables the rate gyroscope to have a very short response time and to be extremely rugged and sturdy. It is, therefore, an object of the present invention to provide sensing elements that are substantially incompressible and to hold those sensing elements in compressed condition in a mechanical connection, between the inner rotor and outer rotor of a rate gyroscope, which forces those rotors to rotate substantially as a unit.

Other and further objects and advantages of the present invention should become apparent from an examination of the drawing and accompanying description.

In the drawing and accompanying description two preferred embodiments of the present invention are shown and described, but it is to be understood that the drawing and the accompanying description are for the purpose of illustration only and do not limit the invention and that the invention will be defined by the appended claims.

Figure 6:
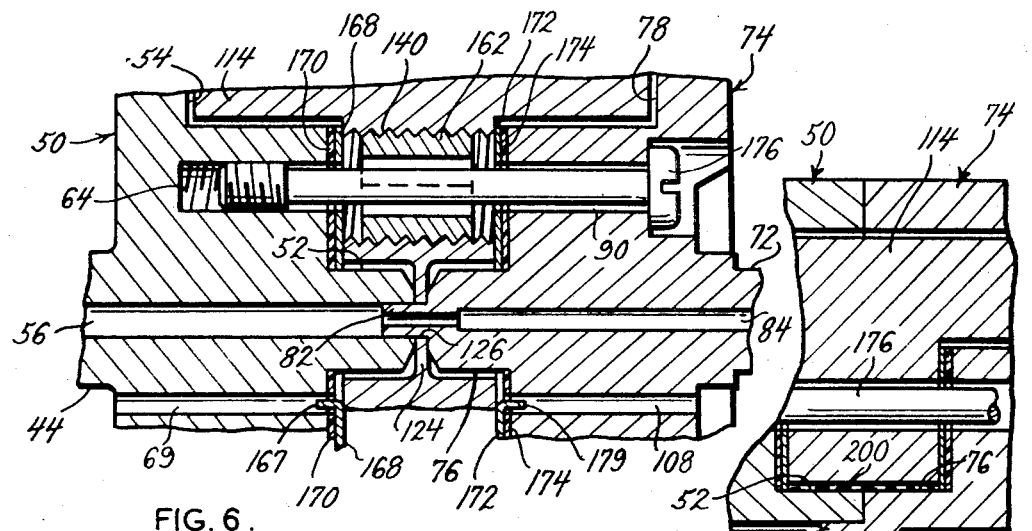
Figure 9:

In the drawing,

FIG. 1 is a longitudinal section through one preferred embodiment of rate gyroscope that is made in accordance with the principles and teachings of the present invention, FIG. 2 is a cross section through the rate gyroscope of FIG. 1, and it is taken along the plane indicated by the line 2—2 in FIG. 1, FIG. 3 is another cross section through the rate gyroscope of FIG. 1, and it is taken along the plane indicated by the line 3—3 in FIG. 1, FIG. 4 is a further cross section through the rate gyroscope of FIG. 1, and it is taken along the plane indicated by the line 4—4 in FIG. 1, FIG. 5 is a longitudinal section, on an enlarged scale, through the rate gyroscope of FIG. 1, and it is taken along the broken plane indicated by the broken line 5—5 in FIG. 2, FIG. 6 is a further longitudinal section, on the scale of FIG. 5, and it is taken along the broken plane indicated by the broken line 6—6 in FIG. 2, FIG. 7 is an exploded view of the inner and outer rotors of the rate gyroscope of FIG. 1, FIG. 8 is a schematic diagram of the sensing elements of the rate gyroscope of FIG. 1, and of the connections between those elements, and FIG. 9 is a longitudinal section through part of another preferred embodiment of rate gyroscope that is made in accordance with the principles and teachings of the present invention.

Components of rate gyroscope

Referring to the drawing in detail, the numeral 20 generally denotes a housing for one preferred embodiment of rate gyroscope that is made in accordance with the principles and teachings of the present invention. That housing has a large cylindrical recess 22 in the right end thereof, and that recess is large enough to accommodate the outer rotor and the inner rotor of the rate gyroscope. The housing 20 also has a small diameter cylindrical passage 24 which is coaxial with the recess 22 and which communicates with that recess. The cylindrical passage 24 extends from the left-hand end of the recess 22 to the left-hand face of the housing 20.

A bearing-supporting bracket 26 abuts the left-hand face of the housing 20, and that bracket has a central opening which accommodates an antifriction bearing 28. That central opening and that bearing are coaxial with the cylindrical passage 24. A resilient washer 27, of rubber or the like, is disposed within that central opening; and that washer bears against the outer edge of the outer race of the antifriction bearing 28. An O-ring 30 is disposed within an annular groove in the bearing-supporting bracket 26, and that O-ring bears against the outer periphery of the outer race of the bearing 28. The washer 27 and the O-ring 30 resiliently hold the outer race of the antifriction bearing 28 away from the metal of the bracket 26. An end plate 32 abuts the outer face of the washer 27 and of the bearing-supporting bracket 26; and that end plate has a central opening therein which is concentric with the cylindrical passage 24 and with the inner race of the bearing 28.

A bearing-supporting bracket 34 has an annular shoulder at the periphery thereof, and that shoulder extends into a rabbet at the right-hand end of the housing 20. The bearing-supporting bracket 34 has a central opening therein to accommodate the outer race of an antifriction bearing 36. A resilient washer, of rubber or the like, is disposed within the central opening; and that washer bears against the outer edge of the outer race of the antifriction bearing 36. An O-ring 38 is disposed within an annular recess in the bearing-supporting bracket 34, and that O-ring bears against the outer periphery of the outer race of the bearing 36. The washer 37 and the O-ring 38 resiliently hold the outer race of the antifriction bearing 36 away from the metal of the bracket 34. That washer and that O-ring coact with the washer 27 and the O-ring 30 to prevent metal-to-metal engagements between the antifriction bearings 28 and 36 and the brackets 26 and 34, and thus minimize the mechanical "noise" that can affect the force-sensitive elements in the gyroscope provided by the present invention; and such minimization improves the efficiency and effectiveness of that gyroscope. A retaining collar 39 abuts the annular shoulder at the periphery of the bracket 34; and that collar is threaded onto a thread at the right-hand end of the housing 20. As a result, that retaining collar holds the bracket 34 solidly in engagement with the housing 20. The engagement between the rabbet at the right-hand end of the housing 20 and the periphery of the annular shoulder on the bracket 34 holds the central opening in that bracket coaxial with the central opening in the bracket 26. A cylinder 40 is held coaxial with the bracket 34 by bolts, and that cylinder defines a recess adjacent the right-hand face of the bracket 34. An end plate 42 is suitably secured to the cylinder 40 to close the recess defined by the cylinder 40.

The numeral 44 denotes a shaft which has the left-hand end thereof disposed within and supported by the inner race of the bearing 28. That shaft supports the rotor 46 of a reference signal generator, and also supports the armature 48 of a motor. The stators, not shown, of that reference signal generator and of that motor are suitably mounted within recesses, not shown, in the housing 20. A rotatable mass, that is generally denoted by the numeral 50, is provided at the right-hand end of the shaft 44; and, to insure precise alignment of that rotatable mass with that shaft, that rotatable mass and that shaft will preferably be machined from one piece of metal.

As indicated particularly by FIG. 7, that rotatable mass is a right-circular cylinder, and it has an annular recess 52 formed in the right-hand face thereof. A further annular recess 54 is formed in the rotatable mass 50; and that further annular recess communicates with, and extends to the left from, the annular recess 52. The annular recess 52 defines a cylindrical abutment 53 which has the right-hand face thereof spaced just a very short distance to the left of the right-hand face of the rotatable mass 50, as shown particularly by FIG. 5. The edge of the cylindrical abutment 53 is cut away at an angle, as shown by the numeral 55 in FIG. 5. An axially directed passage 56 is formed within the cylindrical abutment 53, within the rotatable mass 50, and within part of the shaft 44, as shown particularly by FIGS. 5 and 7. A radially directed passage 58 communicates with the axially directed passage 56, and it places the latter passage in communication with the exterior of the shaft 44 to the left of the rotatable mass 50, as shown by FIGS. 5 and 7. Two axially directed threaded passages 60 and 62 are formed in the rotatable mass 50, and those threaded passages are located on a diameter of that rotatable mass. Six axially directed threaded sockets 64 are formed in the rotatable mass 50, and those threaded sockets extend into that rotatable mass from the base of the annular recess 52 in that rotatable mass. Three of those threaded sockets are disposed to the left of the diameter on which the threaded passages 60 and 62 are located, and those three threaded sockets are spaced from each other and from those threaded passages by twenty-two and one-half degrees. The other three threaded sockets 64 are disposed to the right of the diameter on which the threaded passages 60 and 62 are located, and those three threaded sockets are spaced from each other and from those threaded passages by twenty-two and one-half degrees. A screw 68, which has a socket for an Allen wrench, is disposed within the threaded passage 60; and a similar screw 70 is disposed within the threaded passage 62. The inner faces of the screws 68 and 70 are plane, as shown particularly by FIG. 5, and those inner faces can be set closely adjacent the left-hand face of the annular recess 52 within the rotatable mass 50. Small diameter, axially directed passages 69 and 71 are formed in the rotatable mass 50; and those passages extend between the left-hand face of the recess 52 and the left-hand face of that rotatable mass, as indicated by FIG. 6.

The numeral 72 denotes a shaft which is disposed within and supported by the inner race of the antifriction bearing 36; and a rotatable mass 74 is provided at the left-hand end of that shaft. To insure precise alignment of that rotatable mass with that shaft, that rotatable mass and that shaft will preferably be machined from one piece of metal. As indicated particularly by FIG. 7, that rotatable mass has an annular recess 76 in the left-hand face thereof which confronts, and which is similar to, the annular recess 52 in the right-hand face of the rotatable mass 50. A further annular recess 78 is formed in the rotatable mass 74; and that further annular recess communicates with, and extends to the right from, the recess 76. The annular recess 78 is comparable to the annular recess 54 in the rotatable mass 50. The annular recess 76 defines a cylindrical abutment 80 which has the left-hand face thereof spaced just a very short distance to the right of the left-hand face of the rotatable mass 74, as shown particularly by FIG. 5. Consequently the cylindrical abutment 80 confronts, but is spaced a short distance away from, the cylindrical abutment 53 of the rotatable mass 50. The edge of the cylindrical abutment 80 is cut away, as shown by FIG. 5; and the cut away edges of the cylindrical abutments coact to define a generally V-shaped annular recess.

A cylindrical extension 82 is formed on the cylindrical abutment 80, and that cylindrical extension extends into the axially directed passage 56 in the rotatable mass 50. An axially directed passage 84 is formed in the shaft 72, in the rotatable mass 74, in the cylindrical abutment 80, and in the cylindrical extension 82; and that passage is in communication with the axially directed passage 56 in the rotatable mass 50. Threaded passages 86 and 88 are formed in the rotatable mass 74, as shown by FIGS. 5 and 7, and those threaded passages are in register with the threaded passages 60 and 62 in the rotatable mass 50. Six passages 90 with enlarged outer ends are formed in the rotatable mass 74, and those passages are in register with the threaded sockets 64 in the rotatable mass 50. The rotatable masses 50 and 74 constitute the outer rotor of the rate gyroscope provided by the present invention; and the space which is defined and enclosed by the annular recesses 52 and 76 and by the annular recesses 54 and 78 accommodates the inner rotor of that rate gyroscope.

The numeral 94 denotes a shouldered sleeve of insulation which is telescoped over a reduced-diameter portion of the shaft 72, adjacent the right-hand end of that shaft. A slip ring 96 of conductive material is positioned on the reduced-diameter portion of the shouldered sleeve 94. A second shouldered sleeve 98 of insulation is telescoped over the reduced-diameter portion of the shaft 72, and that sleeve abuts the reduced-diameter portion of the sleeve 94. A slip ring 100 of conductive material is disposed on the reduced-diameter portion of the shouldered sleeve 98. An end washer 102 of insulation is telescoped onto the reduced-diameter portion of the shaft 72 and abuts the reduced-diameter portion of the shouldered sleeve 98. The shouldered washers 94 and 98 and the end washer 102 will be suitably secured onto the reduced-diameter portion of the shaft 72 to prevent relative movement between those sleeves and that shaft.

A screw 104 that is comparable to the screw 68 is disposed within the threaded passage 86 in the rotatable mass 74. A screw 106 that is comparable to the screw 70 is disposed within threaded passage 88. As indicated by FIG. 5, the inner ends of the screws 104 and 106 are plane and can be disposed closely adjacent the right-hand face of the annular recess 76 within the rotatable mass 74. Axially directed passages 108 and 110 are provided in the rotatable mass 74, and those passages extend from the right-hand face of the annular recess 76 to the right-hand face of the rotatable mass 74. For convenience, those axially directed passages are set in register with the axially directed passages 69 and 71 in the rotatable mass 50.

The inner rotor of the rate gyroscope provided by the present invention is generally denoted by the numeral 114; and that inner gyroscope has the form of a right-circular cylinder. A cylindrical recess 116 is formed in the left-hand face of the inner rotor 114, and that recess accommodates the part of the rotatable mass 50 which is defined by the annular recess 54. A similar cylindrical recess 118 is formed in the right-hand face of the inner rotor 114, and that cylindrical recess accommodates the part of the rotatable mass 74 which is defined by the annular recess 78. A small diameter cylindrical recess 120 is formed in the inner rotor 114; and that cylindrical recess is concentric with, and communicates with, the cylindrical recess 116. The cylindrical recess 120 accommodates the cylindrical abutment 53 of the rotatable mass 50. A similar small diameter cylindrical recess 122 is formed in the inner rotor 114; and the cylindrical recess is concentric with, and communicates with, the cylindrical recess 118. The cylindrical recess 122 accommodates the cylindrical abutment 80 of the rotatable mass 74. A thin web 124 is defined by the cylindrical recesses 120 and 122, and that web has an opening 126 through the center thereof. That opening is large enough to accommodate the cylindrical extension 82 on the cylindrical abutment 80 of the rotatable mass 74, as shown by FIG. 5. The web 124 is sturdy and rugged; but it can flex to permit limited tilting of the geometric axis of the inner rotor 114 relative to the geometric axis of the outer rotor.

Cylindrical recesses 128 and 134 are formed in the inner rotor 114, and those recesses extend to and communicate with the cylindrical recess 116 Those recesses are located on a diameter of the inner rotor 114, and they are disposed radially outwardly of the cylindrical recess 120, as shown by FIG. 7. Cylindrical recesses 130 and 136 are formed in the inner rotor 114, and those recesses extend to and communicate with the cylindrical recess 118. The cylindrical recesses 130 and 136 are located on a diameter of the inner rotor 114, and they are disposed radially outwardly of the cylindrical recess 122. The recess 128 and the recess 130 are in register with each other, but they are spaced apart by a web 132 which has an opening through it. Similarly, the recesses 134 and 136 are in register with each other, but are spaced apart by a web 138 which has an opening through it. Threaded passages 140 and 142 are formed in the inner rotor 114, and those threaded passages extend from the cylindrical recess 116 to the cylindrical recess 118. Those threaded passages are located on a diameter of the inner rotor 114, and they are disposed radially outwardly of the cylindrical recesses 120 and 122. Four axially directed passages 144 are formed in the inner rotor 114, and those passages are disposed radially outwardly of the cylindrical recesses 120 and 122. Two of the axially directed passages 144 are located on one diameter of the inner rotor 114, and the other two of those passages are located on another diameter of that inner rotor. The threaded passages 140 and 142 are aligned with two of the six threaded sockets 64 in the rotatable mass 50 and with two of the passages 90 in the rotatable mass 74. The four axially directed passages 144 in the inner rotor 114 are aligned with the other four threaded sockets 64 in the rotatable mass 50 and with the other four passages 90 in the rotatable mass 74.

A shim 146 of conductive material is disposed within the cylindrical recess 128 in the inner rotor 114, and a sensing element 148 is disposed within that recess in abutting engagement with that shim. A shim 150 of conductive material is disposed within the cylindrical recess 134 in the inner rotor 114, and a sensing element 152 is disposed within that recess in abutting engagement with that shim. A shim 154 of conductive material is disposed within the cylindrical recess 130 in the inner rotor 114, and a sensing element 156 is disposed within that recess in abutting engagement with that shim. A shim 158 of conductive material is disposed within the cylindrical recess 136 in the inner rotor 114, and a sensing element 160 is disposed within that recess in abutting engagement with that shim. The sensing elements 148, 152, 156 and 160 can be piezoelectric crystals; and the preferred embodiments of the rate gyroscope shown in the drawing are particularly adapted for use with sensing elements that are piezoelectric crystals. However, the rate gyroscope of the present invention can readily be modified to use the sensing elements of strain gauges, magnetostrictive elements, or the like, as the sensing elements thereof.

A balance weight 162, in the form of a tubular screw, is disposed within the threaded passage 140 in the inner rotor 114. A similar balance weight 164 is disposed within the threaded passage 142 in that inner rotor. The balance weights 162 and 164 are provided with sockets which can accommodate Allen wrenches; and appropriate use of an Allen wrench will move the balance weights 162 and 164 axially of the inner rotor 114. Such movement makes it possible to provide an axial mass shift for the inner rotor 114 that will accommodate manufacturing tolerances.

The numeral 170 denotes an annular disk of insulating material which is dimensioned to fit within the annular recess 52 in the rotatable mass 50. That disk has six openings 171 therein which are set in register with the six threaded sockets 64 in the rotatable mass 50. Also that disk has two smaller openings therein which are set in register with the axially directed passages 69 and 71 in the rotatable mass 50. An annular disk 168 of conductive material is dimensioned to fit within the annular recess 52 in the rotatable mass 50, and that disk abuts the right-hand face of the disk 170. The disk 168 has six openings 166 therein, and those openings are set in register with the six threaded sockets 64 in the rotatable mass 50. The disk 168 also has two short tabs 167 which extend through the two small openings in the disk 170 and extend into the axially directed passages 69 and 71 in the rotatable mass 50. The disk 168 serves as a contact disk, and it abuts the outer faces of the sensing elements 148 and 152 that are disposed, respectively, in the recesses 128 and 134 in the inner rotor 114. An annular disk 174 of insulating material is disposed within the annular recess 76 in the rotatable mass 74; and that disk is identical to the disk 170. The six openings 177 in the disk 174 are in register with the six passages 90 in the rotatable mass 74; and the two smaller openings in that disk are in register with the axially directed passages 108 and 110 in that rotatable mass. An annular contact disk 172, which is identical to the contact disk 168, also is disposed within the annular recess 76 in the rotatable mass 74. The six openings 173 in that contact disk are in register with the six passages 90 in the rotatable mass 74; and the two short tabs 179 on that contact disk extend through the two small openings in the disk 174 and extend into the axially directed passages 108 and 110 in that rotatable mass.

Four elongated screws 176 have the shanks thereof extending through the passages 90 in the rotatable mass 74 and through the passages 144 in the inner rotor 114 to seat in four of the threaded sockets 64 in the rotatable mass 50. Two further elonagted screws 176 have the shanks thereof extending through the remaining two passages 90 in the rotatable mass 74 and through the tubular balancing weights 162 and 164 in the threaded passages 140 nd 142 of the inner rotor 114 to seat in the remaining threaded sockets 64. The screws 176 are tightened until the confronting faces of the cylindrical abutments 53 and 80, respectively, of the rotatable masses 50 and 74 abut the web 124 of the inner rotor 114 in intimate engagement. That engagement is so intimate and so tight that relative circumferential movement of the inner rotor 114 and of the outer rotor is prevented. The engagement between the opening-defining portions of the web 124 and the cylindrical extension 82 is so intimate that relative radial movement of the inner rotor 114 and of the outer rotor is prevented. However, because the edges of the cylindrical abutments 53 and 80 of the rotatable masses 50 and 74 have been cut away, as shown particularly by FIG. 5, and because the web 124 of the inner rotor 114 can flex, the axis of the inner rotor 114 can tilt a minute fraction of an angular second relative to the axis of the outer rotor.

The inner faces of the screws 68 and 70 press against the disk 170 of insulating material and force that disk to press the contact disk 168 against the outer faces of the sensing elements 148 and 152. Similarly, the inner faces of the screws 104 and 106 press against the disk 174 of insulating material and force that disk to press the contact disk 172 against the outer faces of the sensing elements 156 and 160. The forces exerted by the screws 68 and 70 and the forces exerted by the screws 104 and 106 will initially compress the sensing elements 148, 152, 156 and 160; and hence there will be substantially no "play" between the inner rotor 114 and the outer rotor.

An electrical brush 178 is held within the recess defined by the cylinder 40; and that brush bears against the slip ring 100. A similar electrical brush 180 is held within that recess, and it bears against the slip ring 96. Those electrical brushes will be connected to a suitable phase-sensitive detector, not shown. The contact disk 168 directly engages and electrically connects the outer faces of the sensing elements 148 and 152; and a conductor 184 extends from one of the tabs 167 of that contact plate through the passage 69 or the passage 71 in the rotatable mass 50 to a conductor 182. The latter conductor extends through the radially directed passage 58 and through the axially directed passage 56 to the slip ring 96. The contact disk 172 directly engages and electrically connects the outer faces of the sensing elements 156 and 160; and a conductor 186 extends from one of the tabs 179 on that contact disk through the passage 108 or the passage 110 in the rotatable mass 74 to the slip ring 96. The conductive shims 146, 150, 154 and 158 electrically connect the inner faces of the sensing elements 148, 152, 156 and 160 to the inner rotor 114, and the slip ring 110 is suitably connected to that inner rotor. Consequently, as indicated by FIG. 8, the outer faces of all of the sensing elements 148, 152, 156 and 160 are connected together and to the slip ring 96, while the inner faces of all of those sensing elements are connected together and to the slip ring 100. This means that the sensing elements 148, 152, 156 and 160 are connected in a series-parallel arrangement. Further, as indicated by FIG. 8, the sensing elements 148 and 156 have one polarity while the sensing elements 152 and 160 have the opposite polarity.

The compressive forces which are applied to the sensing elements 148, 152, 156 and 160 by the screws 68, 70, 104 and 106 and by the disks 168, 170, 172 and 174 can be set within close limits by the use of torque-indicating Allen wrenches. As a result, the electrical states of the various sensing elements should be substantially the same. However, even if the electrical states of the various sensing elements are not substantially the same, the rate gyroscope provided by the present invention will still provide an accurate indication of the direction of movement of the spin axis of the outer rotor; because the phase-sensitive detector used with that rate gyroscope will be substantially insensitive to the static electrical states of those sensing elements.

The screws 68, 70, 104 and 106 and the threaded passages 60, 64, 86 and 88 therefor are very desirable. Those screws and those passages make it possible to adjust the initial compressive forces on the sensing elements 148, 152, 156 and 160 after the inner rotor 114 and the outer rotor have been assembled.

Operation of rate gyroscope

The rate gyroscope provided by the present invention will preferably be mounted within a movable vehicle, such as an aircraft, missile, or the like, so the axes of the shafts 44 and 72 are parallel to the axis of movement of that movable vehicle. The armature 48 will respond to energization of the stator therefor, not shown, to rotate the shafts 44 and 72 at a high rate of speed, and thus to rotate the outer rotor and the inner rotor 114 substantially as a unit at a high rate of speed. In one preferred embodiment of the present invention, the armature 48 rotated the shafts 44 and 72, and the inner and outer rotors substantially as a unit, at twelve thousand revolutions per minute.

As long as the axis of movement of the movable device follows a straight line, the axes of rotation of the inner and outer rotors of the rate gyroscope will remain precisely coincident. However, if the axis of movement of the movable device rotates about an axis which is perpendicular to that axis of movement, the spin axis of the outer rotor will experience a similar rotation, but the spin axis of the inner rotor 114 will tend to remain parallel to the said straight line. This means that the spin axis of the inner rotor will try to become angularly displaced from the spin axis of the outer rotor.

As long as there is no precession of the spin axis of the outer rotor, there will be substantially no change in the compressive forces on the sensing elements 148, 152, 156 and 160. However, when the spin axis of the outer rotor rotates about an axis which is perpendicular to that spin axis—and thus tries to shift away from the spin axis of the inner rotor 114—portions of the periphery of the inner rotor 114 will try to experience axial displacement relative to corresponding portions of the periphery of the outer rotor. Specifically, a plane through the inner rotor will try to become inclined to a plane through the outer rotor; and, during each revolution of the inner and outer rotors, portions of the periphery of the inner rotor will tend to start at one side of the said plane through the outer rotor, will tend to move toward that plane during the first ninety degrees of that revolution, will tend to pass through and beyond that plane during the second ninety degrees of that revolution until it is as far on the opposite side of the said plane as it was on the first side of that plane at the start of that revolution, will then tend to move back toward that plane during the third ninety degrees of that revolution, and will finally tend to pass back through and beyond that plane during the fourth ninety degrees of that revolution until it is back in its original position. Conversely, other portions of the inner rotor will tend to start at the said opposite side of the said plane through the outer rotor, will tend to move toward that plane during the first ninety degrees of the said revolution, will tend to pass through and beyond that plane during the second ninety degrees of that revolution until it is as far on the first said side of the said plane as it was on the said opposite side of the said plane at the start of that revolution, will then tend to move back toward that plane during the third ninety degrees of that revolution, and will finally tend to pass back through and beyond that plane during the fourth ninety degrees of that revolution until it is back in its original position. Because the sensing elements 148, 152, 156 and 160 are substantially incompressible, the relative axial displacement between those portions of the periphery of the inner rotor and the corresponding portions of the outer rotor will be far too small to be detectable by the eye, but that axial displacement will cause the sensing elements 148, 152, 156 and 160 to experience recurrent increases and decreases in the compressive forces thereon; and those recurrent increases and decreases will recurrently increase and decrease the electrical charges developed across those sensing elements. Those electrical charges will alternate during each half of each revolution of the inner and outer rotors; and hence an alternating voltage will be developed by the sensing elements 148, 152, 156 and 160. That alterntaing voltage will be sinusoidal in nature; and it will be applied to the phase-sensitive detector, not shown, by conductors 184 and 182, by the slip rings 96 and 100, and by the electrical brushes 180 and 178. The greater the rate at which the spin axis of the outer rotor rotates about the said perpendicular axis, the greater the amplitude of the sinusoidal alternating voltage, which the sensing elements 148, 152, 156 and 160 apply to the phase-sensitive detector, will be.

Because the sensing elements 148 and 156 are arranged to have one polarity while the sensing elements 152 and 160 are arranged to have the opposite polarity, the dynamic changes in the charges developed across the sensing elements will aid each other rather than buck each other. Specifically, whenever the spin axis of the outer rotor rotates about the said perpendicular axis in such a way as to increase the compressive forces on the sensing elements 148 and 160, that rotation will simultaneously cause a corresponding decrease in the compressive forces on the sensing elements 152 and 156.

Thereupon, the value of the positive charges which the sensing elements 148 and 160 apply to the slip ring 96 will increase while the value of the positive charges which the sensing elements 152 and 156 apply to the slip ring 100 will decrease. Conversely, if the spin axis of the outer rotor rotates about the said perpendicular axis in such a way as to increase the compressive forces on the sensing elements 152 and 156, that rotation will simultaneously cause a corresponding decrease in the compressive forces on the sensing elements 148 and 160. Thereupon, the value of the positive charges which the sensing elements 152 and 156 apply to the slip ring 100 will increase while the value of the positive charges which the sensing elements 148 and 160 apply to the slip ring 96 will decrease.

As the armature 48 rotates the shafts 44 and 72 and the inner and outer rotors substantially as a unit, it also rotates the rotor 46 of the reference signal generator; and that reference signal generator will generate reference signals which will be supplied to the phase-sensitive detector, not shown. The reference signals supplied by the signal reference generator will be ninety degrees out of phase with each other. As the phase-sensitive detector receives the varying positive charges from the slip rings 96 and 100, it will also receive the signals from the reference signal generator; and that phase-sensitive detector will indicate the rate at, and the direction in, which the spin axis of the outer rotor departs from the original axis of movement of the movable device. Consequently, the rate gyroscope provided by the present invention, is able to sense the rate and direction of rotation of the spin axis of the outer rotor about any axis lying in a plane which is perpendicular to that spin axis. The phase-sensitive detector and the reference signal generator can be the phase-sensitive detector and the reference signal generator disclosed in copending application Ser. No. 163,159 for Gyroscopic Apparatus, which was filed by Allan W. Lindberg and Raymond H. Marcus on or about Dec. 26, 1961, now U.S. Patent No. 3,276,167.

Although the inner rotor 114 will tend to continue to rotate about its spin axis, as the spin axis of the outer rotor rotates about the said perpendicular axis, the substantially incompressible, sensing elements 148, 152, 156 and 160, will force that inner rotor to process. Specifically, as the spin axis of the outer rotor rotates about the said perpendicular axis, the sensing elements 148, 152, 156 and 160 will force that inner rotor to precess about an axis which is substantially parallel to the said perpendicular axis. The overall result is that while the axial displacement of portions of the inner rotor 114 relative to corresponding portions of the outer rotor will be able to cause the sensing elements 148, 152, 156 and 160 to develop a readily detectable signal, that displacement will be far too small to be detected by the eye, and hence the outer and inner rotors will always rotate substantially as a unit.

If the spin axis of the outer rotor rotates about the said perpendicular axis at a constant rate, the angular displacement between the spin axes of the inner and outer rotors will remain constant; and the amplitude and phase of the signal supplied to the phase-sensitive detector by the sensing elements 148, 152, 156 and 160 will remain constant. This means that the said phase-sensitive detector will indicate that the orientation of the outer rotor—and hence of the movable device in which it is mounted—is departing from parallelism with its path or movement at a constant rate.

If the rate at which the spin axis of the outer rotor rotates about the said perpendicular avis then increases, the amplitude of the signal supplied to the phase-sensitive detector by the sensing elements 148, 152, 156 and 160 would increase and would enable that phase-sensitive detector to indicate that the orientation of the outer rotor—and hence of the movable device in which it is mounted—was departing from parallelism with its path of movement at an increased rate. Conversely, if the rate at which the spin axis of the outer rotor rotates about the said perpendicular axis decreased rather than increased, the amplitude of the signal supplied to the phase-sensitive detector by the sensing elements 148, 152, 156 and 160 would decrease and would enable that phase-sensitive detector to indicate that the orientation of the outer rotor—and hence of the movable device in which it is mounted—was departing from parallelism with its path of movement at a reduced rate. The overall result is that the rate gyroscope provided by the present invention can accurately and directly provide electric signals that can be used to indicate the rates at which a movable device, in which the said rate gyroscope is mounted, is changing direction.

The axially directed forces which portions of the periphery of the inner rotor 114 tend to apply to corresponding portions of the outer rotor will be greatest at two points, spaced one hundred and eighty degrees apart, during each revolution of those rotors; and the changes in the positive charges provided by the sensing elements 148, 162, 156 and 160 will be greatest at those two points. The angular displacements between those two points and the reference signals provided by the reference signal generator will precisely indicate the direction in which the movable device turns as it departs from parallelism with its axis of movement. In this way, the rate gyroscope provided by the present invention provides signals which precisely indicate the direction, as well as the rate, of departures of a movable vehicle from parallelism with its axis of movement.

It will be noted that when the spin axes of the outer rotor and the inner rotor are coincident, no alternating signal is generated by the sensing elements 148, 152, 156 and 160. Further, it will be noted that the alternating signals which are generated by those sensing elements are due solely to the sinusoidal axial faces which portions of the periphery of the inner rotor tend to apply to the corresponding portions of the outer rotor. Consequently, any bias errors and any errors due to variations in the initial compressive forces on the sensing elements 148, 152, 156 and 160 cannot appreciably affect the accuracy of the signals provided by the rate gyroscope of the present invention.

It will be noted that the rate gyroscope of the present invention measures a modulation of an angular relation rather than an absolute angular displacement. Consequently, the accuracy of measurement can be high; and this, despite the fact that the rate gyroscope provided by the present invention is a very simple and reliable device.

The rate gyroscope provided by the present invention is very sensitive to even limited rotation of the spin axis of the outer rotor about axes perpendicular to that spin axis. Further, that rate gyroscope is able to respond to even very extensive rotation of that spin axis about those axes. In addition, that rate gyroscope is inexpensive to manufacture; and it is rugged and requires substantially no maintenance.

Because the inner rotor and the outer rotor of the rate gyroscope provided by the present invention are positively held against relative circumferential movement, there can be no lag in the response of the rate gyroscope due to circumferential slippage between the inner and outer rotors. Also, there can be no error-producing phase displacement between the signals provided by the reference signal generator and the signals provided by the sensing elements 148, 152, 156 and 160. As a result, the rate gyroscope provided by the present invention can provide exceedingly accurate signals, and thus can provide unusually precise determination of the direction in which the vehicle, in which the rate gyroscope is mounted, is turning.

The electric motor of which the armature 48 is a part is very useful in rotating the inner and outer rotors. However, where desired, a gas-propelled, pneumatic, hydraulic or other motor could be used in lieu of that electric motor.

The slip rings 96 and 100 constitute an inexpensive and simple means for transmitting the signals from the sensing elements 148, 152, 156 and 162 to the phase-sensitive detector. However, if desired, a transformer or other means could be used in lieu of those slip rings.

To additionally increase the efficiency of the rate gyroscope provided by the present invention, the space between the inner rotor 114 and inner surfaces of the annular recesses within the outer rotor can be filled with a viscous fluid. While liquids are more viscous than gases, liquids are not as desirable as gases, because the damping provided by liquids is usually more sensitive to temperature, than is the damping provided by gases. Consequently, it will usually be desirable to fill the space, between the inner rotor 114 and the inner surfaces of the annular recesses within the outer rotor, with a heavy, noncorrosive gas to damp the movements of the said portions of the periphery of the inner rotor 114 relative to the corresponding portions of the outer rotor.

If desired, the inner rotor 114 and the shafts 44 and 72 could be machined from a single piece of metal. Where that was done, the rotatable masses 50 and 74 would be suitably secured to the shafts 44 and 72.

In the embodiment of gyroscope shown by FIGURES 1–8, the sensing elements are in the mechanical connection between the inner rotor 114 and the outer rotor, but those sensing elements do not have to be in that mechanical connection, For example, a substantially incompressible mechanical connection could be provided between the inner and outer rotors, and sensing elements of the capacitive type could be disposed between those rotors without being part of that mechanical connection.

If desired, the web 124 could be eliminated, as shown by FIGURE 9. The embodiment of gyroscope shown by FIGURE 9 has the rotatable masses 50 and 74 and has the inner rotor 114. The only difference between the gyroscope of FIGURE 9 and the gyroscope of FIGURES 1–8 are: the elimination of the web 124 of the inner rotor 114, the lengthening of the cylindrical abutments 53 and 80 to enable them to abut each other, the squaring-off of the confronting ends of those abutments, the reduction in the weight of the inner rotor 114 by the provision of liquid-tight recesses, not shown, therein, and the use of a heavy noncorrosive liquid 200 in the space between the inner and outer rotors. The liquid-tight recesses in the inner rotor 114 will be formed so that inner rotor will continue to be properly balanced, and so that inner rotor will have neutral buoyancy when immersed within the liquid 200.

In the gyroscope of FIGURE 9, the mechanical connection between the inner and outer rotors, which includes the sensing elements 148, 152, 156 and 160, will hold the inner rotor 114 against circumferential or radial displacement relative to the outer rotor. The liquid 200, by providing neutral buoyancy for the inner rotor 114, will minimize the shear forces that will be applied to the sensing elements 148, 152, 156 and 160. The mechanical connection which includes those sensing elements will limit the axial displacements of portions of the periphery of the inner rotor relative to corresponding portions of the outer rotor to such small values that they will not be detectable by the eye. As a result, the inner rotor and the outer rotor of the gyroscope of FIGURE 9 will rotate substantially as a unit even though the web 124 has been eliminated.

Whereas the drawing and accompanying description have shown and described two preferred embodiments of the present invention, it should be apparent to those skilled in the art that various changes may be made in the form of the invention without affecting the scope thereof.

What I claim is:

1. A rate gyroscope that comprises:
   (a) a housing,
   (b) bearings disposed within said housing to support a rotatable member,
   (c) said bearings enabling said member to rotate about a predetermined spin axis,
   (d) an electric motor disposed within said housing and having the rotor thereof connected to said rotatable member to rotate said rotatable member about said predetermined spin axis,
   (e) said rotatable member having an annular recess therein which is elongated adjacent the periphery thereof and which is substantially shorter intermediate said periphery and the center thereof,
   (f) an inner rotor disposed within said annular recess and having a short portion that is disposed within and that substantially fills said substantially shorter portion of said annular recess,
   (g) a shallow, radially directed, resilient connection between said rotatable member and said inner rotor which holds said inner rotor against radial or circumferential displacement relative to said rotatable member but permits axial displacement of portions of the periphery of said inner rotor relative to corresponding portions of said rotatable member,
   (h) said rotatable member serving as the outer rotor for said gyroscope,
   (i) said inner rotor being adapted to rotate concentrically about said spin axis when said rotatable member rotates about said spin axis and tending to continue to rotate concentrically about said spin axis when the axis of movement of said rotatable member is forced to rotate about a further axis which is angularly displaced from said spin axis,
   (j) a plurality of pressure-responsive, sensing elements that are disposed between and held under compression by substantially incompressible and substantially inflexible confronting portions of said inner rotor and said rotatable member, one of said substantially incompressible, substantially inflexible confronting portions having a plurality of sockets therein to receive and confine said plurality of sensing elements,
   (k) said sensing elements initially being compressed between said substantially incompressible and substantially inflexible confronting portions of said inner rotor and said rotatable member but experiencing changes in the compressive forces thereon during said axial displacement of said portions of said periphery of said inner rotor relative to said corresponding portions of said rotatable member,
   (l) a reference generator disposed within said housing and having a rotor connected to and rotatable with said rotatable member,
   (m) said reference generator having the output thereof connected to a phase sensitive detector,
   (n) connections between said sensing elements and said phase sensitive detector,
   (o) said sensing elements being connected in a series-parallel arrangement,
   (p) some of said sensing elements being arranged to have one polarity and other of said sensing elements being arranged to have the opposite polarity,
   (q) said some sensing element being disposed to experience increased compressive forces during part of said axial displacement of said portions of said periphery of said inner rotor relative to said corresponding portions of said rotatable member, as said axis of movement of said rotatable member rotates about an axis angularly displaced from said spin axis, and said other sensing elements being disposed to experience decreased compressive forces during said part of said axial displacement of said portions of said periphery of said inner rotor relative to said corresponding portions of said rotatable member as said axis of movement of said rotatable member rotates about said angularly displaced axis,
   (r) said sensing elements responding to variations in the values of the compressive forces thereon to vary the amplitudes of the signals developed thereby,
   (s) whereby the signals supplied by said some sensing elements will increase during said part of said axial displacement of said portions of said inner rotor relative to said corresponding portions of said rotatable member while the signals supplied by said other sensing elements will decrease during said part of said axial displacement of said portions of said inner rotor relative to said corresponding portions of said rotatable member during said rotation of said axis of movement of said rotatable member about said angularly displaced axis,
   (t) said inner rotor responding to different rates of rotation of said axis of movement of said rotatable member about said angularly disposed axis to provide different increases in the compressive forces on said some sensing elements and to provide different decreases in the compressive forces on said other sensing elements,
   (u) said sensing elements responding to differing degrees of axial displacement of said portions of the periphery of said inner rotor relative to the said corresponding portions of said rotatable member to provide indications of the rates at which said axis of movement of said rotatable member rotates about said angularly displaced axis,
   (v) said resilient connecting portion being a thin web at the center of said inner rotor,
   (w) said sensing elements being piezoelectric crystals, and
   (x) adjusting screws that are carried by said rotatable member and that are in register with said sensing elements, said adjusting screws being part of said substantially incompressible and substantially-flexible confronting portion of said rotatable member,
   (y) said adjusting screws extending to the exterior of said rotatable member to facilitate adjustment of the compressive forces on said sensing elements after said inner rotor has been disposed within and assembled with said rotatable member,
   (z) said inner rotor having annular portions at the periphery thereof which extend axially into and substantially fill complementary portions of said recess in said annular rotatable member,
   (aa) said sensing elements being relatively incompressible,
   (ab) said sensing elements being arranged in pairs, with the sensing elements of each pair of sensing elements disposed on a line that is normally coaxial with said spin axis, with one of the sensing elements of each pair of sensing elements disposed at one face of said inner rotor, and with the other of said sensing elements of each pair of sensing elements disposed at the opposite face of said inner rotor, (ac) said sensing elements being close to said axis.

2. A rate gyroscope that comprises:
(a) a housing,
(b) bearings disposed within said housing to support a rotatable member,
(c) said bearings enabling said rotatable member to rotate about a predetermined spin axis,
(d) said rotatable member having an annular recess therein which is elongated adjacent the periphery thereof and which is substantially shorter intermediate said periphery and the center thereof,
(e) an inner rotor disposed within said annular recess and having a short portion that is disposed within and that substantially fills said substantially shorter portion of said annular recess,
(f) a shallow, radially directed, resilient connection between said rotatable member and said inner rotor which holds said inner rotor against radial or circumferential displacement relative to said rotatable member but permits axial displacement of portions of the periphery of said inner rotor relative to portions of said rotatable member,
(g) said rotatable member serving as the outer rotor for said gyroscope,
(h) said inner rotor being adapted to rotate concentrically about said spin axis when said rotatable member rotates about said spin axis and tending to continue to rotate concentrically about said spin axis when the axis of movement of said rotatable member is forced to rotate about a further axis which is angularly displaced from said spin axis,
(i) a plurality of pressure-responsive, sensing elements that are disposed between and held under compression by substantially incompressible and substantially inflexible confronting portions of said inner rotor and said rotatable member, one of said substantially incompressible, substantially inflexible confronting portions having a plurality of sockets therein to receive and confine said plurality of sensing elements,
(j) said sensing elements initially being compressed between said substantially incompressible and substantially inflexible confronting portions of said inner rotor and said rotatable member but experiencing changes in the compressive forces thereon during said axial displacement of said portions of said periphery of said inner rotor relative to said corresponding portions of said rotatable member,
(k) connections to connect said sensing elements with a phase sensitive detector,
(l) said sensing elements being connected in a series-parallel arrangement,
(m) some of said sensing elements being arranged to have one polarity and other of said sensing elements being arranged to have the opposite polarity,
(n) said some sensing elements being disposed to experience increased compressive forces during part of said axial displacement of said portions of said periphery of said inner rotor relative to said corresponding portions of said rotatable member, as said axis of movement of said rotatable member rotates about an axis angularly displaced from said spin axis, and said other sensing elements being disposed to experience decreased compressive forces during said part of said axial displacement of said portions of said periphery of said inner rotor relative to said corresponding portions of said rotatable member as said axis of movement of said rotatable member rotates about said angularly displaced axis,
(o) said sensing elements responding to variations in the values of the compressive forces thereon to vary the amplitudes of the signals developed thereby,
(p) whereby the signals supplied by said some sensing elements will increase during said part of said axial displacement of said portions of said inner rotor relative to said corresponding portions of said rotatable member while the signals supplied by said other sensing elements will decrease during said part of said axial displacement of said portions of said inner rotor relative to said corresponding portions of said rotatable member during said rotation of said axis of movement of said rotatable member about said angularly displaced axis,
(q) said inner rotor responding to different rates of rotation of said axis of movement of said rotatable member about said angularly disposed axis to provide different increases in the compressive forces on said some sensing elements and to provide different decreases in the compressive forces of said other sensing elements,
(r) said sensing elements responding to differing degrees of axial displacement of said portions of the periphery of said inner rotor relative to the said corresponding portions of said rotatable member to provide indications of the rates at which said axis of movement of said rotatable member rotates about said angularly displaced axis,
(s) said resilient connecting portion being a thin web at the center of said inner rotor,
(t) said sensing elements being piezoelectric crystals, and
(u) adjusting screws that are carried by said rotatable member and that are in register with said sensing elements, said adjusting screws being part of said substantially incompressible and substantially inflexible confronting portion of said rotatable member,
(v) said adjusting screws extending to the exterior of said rotatable member to facilitate adjustment of the compressive forces on said sensing elements after said inner rotor has been disposed within and assembled with said rotatable member,
(w) said inner rotor having annular portions at the periphery thereof which extend axially into and substantially fill complementary portions of said recess in said rotatable member,
(x) said sensing elements being relatively incompressible,
(y) said sensing elements being close to said spin axis.

3. A rate gyroscope that comprises:
(a) a member that is rotatable about a predetermined spin axis and that has an annular recess, therein, said annular recess being elongated adjacent the periphery thereof and being substantially shorter intermediate said periphery and the center thereof,
(b) a second member that is disposed within said annular recess in the first said member, said second member having an elongated peripheral portion that is disposed within and that substantially fills the elongated portion of said annular recess in the first said member and having a substantially shorter portion that is disposed within and that substantially fills said substantially shorter intermediate portion of said annular recess in said first said member, and
(c) a connection between said second member and the first said member which holds said second member against appreciable radial or circumferential displacement relative to the first said member, said connection including a radially directed web,
(d) said connection causing said second member to rotate about said spin axis when the first said member rotates about said spin axis,
(e) said second member tending to continue to rotate about said spin axis when the axis of movement of the first said member is forced to rotate about a further axis which is angularly displaced from said spin axis but said connection forcing said second member to rotate about said further axis, (f) sensing means adjacent and compressed between substantially incompressible and substantially inflexible confronting portions of the first said member and said second member, (g) said sensing means experiencing changes in the electrical characteristics thereof as the compressive forces thereon are varied, and the tendency of said second member to continue to rotate about said spin axis during said rotation of the first said member about said further axis causing the first said and said second members to vary the compressive forces on said sensing means, and thereby cause said sensing means to experience changes in the electrical characteristics thereof, (h) said sensing means responding to variations in the compressive forces thereon, due to variations in the rate of rotation of the first said member about said further axis to vary the changes in the electrical characteristics thereof, (i) whereby said sensing means can indicate the rate at which the first said member rotates about said further axis, (j) said sensing means being substantially incompressible, (k) said sensing means being part of said connection and helping to force said second member to rotate about said further axis when the first said member rotates about said further axis, (l) the first said member and said second member rotating about said spin axis and about said further axis substantially as a unit, (m) said sensing means including piezoelectric elements, (n) said substantially incompressible and substantially inflexible portion of said second member being part of said substantially shorter portion of said second member, and said substantially incompressible and substantially inflexible portion of said first said member helping form said intermediate portion of said annular recess whereby said piezoelectric elements are close to said spin axis, (o) said piezoelectric elements being arranged in pairs, with the piezoelectric elements of each pair of piezoelectric elements disposed on a line that is coaxial with said spin axis, with one piezoelectric element of any given pair of piezoelectric elements disposed at one face of said second member, and with the other piezoelectric element of said given pair of piezoelectric elements disposed at the opposite face of said second member.

4. A rate gyroscope that comprises:

(a) a member that is rotatable about a predetermined spin axis and that has an annular recess therein, said annular recess being elongated adjacent said periphery thereof and being substantially shorter intermediate said periphery and the center thereof, (b) a second member that is disposed within said annular recess in the first said member, said second member having an elongated peripheral portion that is disposed within and that substantially fills the elongated portion of said annular recess in the first said member and having a substantially shorter portion that is disposed within and that substantially fills said substantially shorter intermediate portion of said annular recess in said first said member, and (c) a connection between said second member and the first said member which holds said second member against appreciable radial or circumferential displacement relative to the first said member, said connection including a radially-directed web, (d) said connection causing said second member to rotate about said spin axis when the first said member rotates about said spin axis, (e) said second member tending to continue to rotate about said spin axis when the axis of movement of the first said member is forced to rotate about a further axis which is angularly displaced from said spin axis but said connection forcing said second member to rotate about said further axis, (f) substantially incompressible sensing means adjacent and compressed between substantially incompressible and substantially inflexible confronting portions of the first said member and said second member, (g) said sensing means experiencing changes in the electrical characteristics thereof as the compressive forces thereon are varied, and the tendency of said second member to continue to rotate about said spin axis during said rotation of the first said member about said further axis causing the first said and said second members to vary the compressive forces on said sensing means, and thereby cause said sensing means to experience changes in the electrical characteristics thereof, (h) said sensing means responding to variations in the compressive forces thereon, due to variations in the rate of rotation of the first said member about said further axis to vary the changes in the electrical characteristics thereof, (i) whereby said sensing means can indicate the rate at which the first said member rotates about said further axis, (j) said sensing means including piezoelectric elements, (k) insulation adjacent one end of each of said piezoelectric elements, (l) conductors connected to and extending from said one end of said piezoelectric elements, (m) said second member being electrically connected to the opposite ends of, and serving as a common conductor for, said piezoelectric elements, (n) said substantially incompressible and substantially inflexible portion of said second member being part of said substantially shorter portion of said second member, and said substantially incompressible and substantially inflexible portion of said first said member helping form said intermediate portion of said annular recess, whereby said piezoelectric elements are disposed close to said spin axis, (o) said piezoelectric elements being arranged in pairs, with the piezoelectric elements of each pair of piezoelectric elements disposed on a line that is coaxial with said spin axis and with one piezoelectric element of any given pair of piezoelectric elements disposed at one face of said second member and with the other piezoelectric element of said given pair of piezoelectric elements disposed at the opposite face of said second member, (p) at least one of said piezoelectric elements at said one face of said second member being oriented oppositely of another of said piezoelectric elements at said one face of said second member, at least one of said piezoelectric elements at said opposite face of said second member being oriented oppositely of another of said piezoelectric elements at said opposite face of said second member.

5. A rate gyroscope that comprises:

(a) a member that is rotatable about a predetermined spin axis and that has an annular recess therein, said annular recess being elongated adjacent said periphery thereof and being substantially shorter intermediate said periphery and the center thereof, (b) a second member that is disposed within said annular recess in the first said member, said second member having an elongated peripheral portion that is disposed within and that substantially fills the elongated portion of said annular recess in the first said member and having a substantially shorter portion that is disposed within and that substantially fills said substantially shorter intermediate portion of said annular recess in said first said member, and (c) a connection between said second member and the first said member which holds said second member against appreciable radial or circumferential displacement relative to the first said member, (d) said connection causing said second member to rotate about said spin axis when the first said member rotates about said spin axis, (e) said second member tending to continue to rotate about said spin axis when the axis of movement of the first said member is forced to rotate about a further axis which is angularly displaced from said spin axis but said connection forcing said second member to rotate about said further axis, (f) substantially incompressible sensing means adjacent and compressed between substantially incompressible and substantially inflexible confronting portions of the first said member and said second member, (g) said sensing means experiencing changes in the electrical characteristics thereof as the compressive forces thereon are varied, and the tendency of said second member to continue to rotate about said spin axis during said rotation of the first said member about said further axis causing the first said and said second members to vary the compressive forces on said sensing means, and thereby cause said sensing means to experience changes in the electrical characteristics thereof, (h) said sensing means responding to variations in the compressive forces thereon, due to variations in the rate of rotation of the first said member about said further axis to vary the changes in the electrical characteristics thereof, (i) whereby said sensing means can indicate the rate at which the first said member rotates about said further axis, (j) the first said member constituting an outer rotor for said rate gyroscope, (k) said second member constituting an inner rotor for said rate gyroscope, (l) said sensing means including piezoelectric elements, (m) said substantially incompressible and substantially inflexible portion of said second member being part of said substantially shorter portion of said second member, and said substantially incompressible and substantially inflexible portion of said first said member helping form said intermediate portion of said annular recess, whereby said piezoelectric elements are disposed close to said spin axis.

6. A rate gyroscope that comprises:

(a) a member that is rotatable about a predetermined spin axis, (b) a second member that is telescoped within and that is completely enclosed by the first said member, and (c) a connection between said second member and the first said member which holds said second member against appreciable radial or circumferential displacement relative to the first said member, (d) said connection causing said second member to rotate about said spin axis when the first said member rotates about said spin axis, (e) said second member tending to continue to rotate about said spin axis when the axis of movement of the first said member is forced to rotate about a further axis which is angularly displaced from said spin axis but said connection forcing said second member to rotate about said further axis, (f) substantially incompressible sensing means adjacent and compressed between substantially incompressible and substantially inflexible confronting portions of the first said member and said second member, (g) said sensing means experiencing changes in the electrical characteristics thereof as the compressive forces thereon are varied, and the tendency of said second member to continue to rotate about said spin axis during said rotation of the first said member about said further axis causing the first said and said second members to vary the compressive forces on said sensing means, and thereby cause said sensing means to experience changes in the electrical characteristics thereof, (h) said sensing means responding to variations in the compressive forces thereon, due to variations in the rate of rotation of the first said member about said further axis to vary the changes in the electrical characteristics thereof, (i) whereby said sensing means can indicate the rate at which the first said member rotates about said further axis, (j) said second member having portions thereof movable to shift the center of mass of said second member, (k) the first said member having portions thereof, in register with said portions of said second member, that are removable to facilitate adjustment of the positions of said portions of said second member, whereby the positions of said portions of said second member can be adjusted after said second member has been telescoped within and completely enclosed by the first said member, (l) said sensing elements being close to the center of said second member.

7. A rate gyroscope that comprises:

(a) bearings to support a rotatable member, (b) said bearings enabling said rotatable member to rotate about a predetermined spin axis, (c) said rotatable member including two elements, each of said elements having a recess therein said recesses in said elements communicating with each other to define a large recess, (d) an inner rotor disposed within said large recess, (e) a mechanical connection between said rotatable member and said inner rotor which holds said inner rotor against radial or circumferential displacement relative to said rotatable member, (f) said rotatable member serving as the outer rotor for said gyroscope, (g) said inner rotor being adapted to rotate about said spin axis when said rotatable member rotates about said spin axis, (h) said inner rotor tending to continue to rotate about said spin axis when the axis of movement of said rotatable member is forced to rotate about a further axis which is angularly displaced from said spin axis but said mechanical connection forcing said inner rotor to rotate about said further axis, (i) a plurality of substantially incompressible sensing elements that are disposed between said inner rotor and said rotatable member, (j) said sensing elements initially being compressed between substantially incompressible, substantially inflexible confronting surfaces of said inner rotor and said rotatable member but experiencing changes in the compressive forces thereon during said rotation of said rotatable member about said further axis, (k) some of said sensing elements being disposed to experience increased compressive forces during part of said rotation of said rotatable member about said further axis, and said other sensing elements being disposed to experience decreased compressive forces during said part of said rotation of said rotatable member about said further axis, (l) said sensing elements responding to variations in the values of the compressive forces thereon to vary the amplitudes of the signals developed thereby, (m) whereby the signals supplied by said some sensing elements will increase during said part of said rotation of said rotatable member about said further axis while the signals supplied by said other sensing elements will decrease during said part of said rotation of said rotatable member about said further axis, (n) said inner rotor responding to different rates of rotation of said rotatable member about said further axis to provide different increases in the compressive forces on said some sensing elements and to provide different decreases in the compressive forces of said other sensing elements, and (o) adjusting screws that are carried by said rotatable member and that are in register with said sensing elements, said adjusting screws constituting part of said substantially incompressible, substantially inflexible portion of said rotatable member, (p) said adjusting screws extending to the exterior of said rotatable member to facilitate adjustment of the compressive forces on said sensing elements after said inner rotor has been disposed within and assembled with said rotatable member, (q) one of said elements of said rotatable member having an annular recess opening to one face thereof and having a second annular recess which opens to the first said recess and thus to said one face of said element, said annular recesses being formed and dimensioned so they can be machined from said one face of said element, (r) the other of said elements of said rotatable member having an annular recess opening to one face thereof and having a second annular recess which opens to the first said recess and thus to said one face of said element, said annular recesses being formed and dimensioned so they can be machined from said one face of said other element, (s) said inner rotor having a plurality of recesses opening to one face thereof and having a second plurality of recesses opening to the opposite face thereof, said recesses in said inner rotor being formed and dimensioned so the first said plurality of recesses can be machined from said one face of said inner rotor and so said second plurality of recesses can be machined from said second face of said inner rotor, (t) said elements of said rotatable member having axially directed portions thereof extending into and substantially filling at least one of said recesses of the first said plurality of recesses of said inner rotor and extending into and substantially filling at least one of said recesses of said second plurality of recesses of said inner rotor, (u) said inner rotor having portions that extend into and substantially fill said recesses in each of said elements of said rotatable member, whereby the air spaces within said gyroscope are very small.

8. A rate gyroscope that comprises:
(a) a rotatable member,
(b) said rotatable member having a recess therein,
(c) an inner rotor disposed within said recess, said inner rotor having a relatively massive, annular, peripheral portion extending axially from one face thereof and having a relatively massive, annular, peripheral portion extending axially in the opposite direction from the opposite face thereof, said relatively massive, annular, peripheral portions constituting a substantial part of the mass of said inner rotor, (d) a mechanical connection between said rotatable member and said inner rotor which holds said inner rotor against radial or circumferential displacement relative to said rotatable member, (e) said rotatable member serving as the outer rotor for said gyroscope, (f) said inner rotor being adapted to rotate about said spin axis when said rotatable member rotates about said spin axis, (g) said inner rotor tending to continue to rotate about said spin axis when the axis of movement of said rotatable member is forced to rotate about a further axis which is angularly displaced from said spin axis but said mechanical connection forcing said inner rotor to rotate about said further axis, (h) a plurality of sensing elements disposed between substantially incompressible, substantially inflexible confronting portions of said rotatable member and of said inner rotor, some of said sensing elements being disposed to experience compressive forces applied thereto by said substantially incompressible, substantially inflexible confronting portions of said rotatable member and of said inner rotor during part of said rotation of said rotatable member about said further axis, and other of said sensing elements being disposed not to experience such forces during said part of said rotation of said rotatable member about said further axis, (i) said sensing elements responding to compressive forces thereon to vary signals developed thereby, (j) whereby the signals supplied by said some sensing elements will increase while the signals supplied by said other sensing elements will not increase during said part of said rotation of said rotatable member about said further axis, (k) said sensing elements directly acting as parts of said mechanical connection between said rotatable member and said inner rotor and thus helping hold said inner rotor against radial or circumferential displacement relative to said rotatable member, (l) said sensing elements being disposed radially inwardly of said relatively massive, annular, peripheral portions of said inner rotor, and thus being disposed radially inwardly of the substantial portion of the mass of said inner rotor.

References Cited

UNITED STATES PATENTS

| | | | |
|---|---|---|---|
| 2,719,291 | 9/1955 | Wing | 74—5 XR |
| 3,147,627 | 9/1964 | Hunn | 74—5.6 |
| 3,148,550 | 9/1964 | Iddings | 74—5.6 |
| 3,222,937 | 12/1965 | Konet | 74—5.6 |
| 3,251,233 | 5/1966 | Duncan | 74—5 XR |
| 3,267,746 | 8/1966 | Scotto | 74—5.6 |
| 3,301,073 | 1/1967 | Howe | 74—5 XR |

C. J. HUSAR, *Primary Examiner.*

U.S. Cl. X.R.

74—5.6